United States Patent [19]

Wood

[11] Patent Number: 5,328,373
[45] Date of Patent: Jul. 12, 1994

[54] METHOD AND APPARATUS FOR TEACHING READING

[76] Inventor: Regna Lee Wood, Rte. 1, Box 81, Spiro, Okla. 74959

[21] Appl. No.: 40,152

[22] Filed: Mar. 30, 1993

[51] Int. Cl.5 .......................... G09B 1/16; G09B 1/34; G09B 1/40; G09B 1/00
[52] U.S. Cl. .................................... 434/172; 434/159
[58] Field of Search ............... 434/156, 159, 168, 167, 434/170, 172

[56] References Cited

U.S. PATENT DOCUMENTS

| | | | |
|---|---|---|---|
| 1,735,883 | 11/1929 | Smith | 434/167 X |
| 3,305,945 | 2/1967 | Crawford et al. | 434/159 |
| 4,299,577 | 11/1981 | Marryman | 434/170 |
| 4,575,091 | 3/1986 | Boomer | 273/199 |
| 4,768,959 | 9/1988 | Sprague et al. | 434/156 |

FOREIGN PATENT DOCUMENTS 1547824 6/1979 United Kingdom ................ 434/170

OTHER PUBLICATIONS

"Teaching The Initial Teaching Alphabet", *Time*, Apr. 3, 1964, p. 52.
"How Johnny Can Be Taught To Read-A New Alphabet," U.S. News & World Report, May 18, 1964, pp. 76–77.

*Primary Examiner*—Gene Mancene
*Assistant Examiner*—Cindy A. Cherichetti
*Attorney, Agent, or Firm*—James T. Robinson; John W. Wustenberg

[57] ABSTRACT

An aid for teaching students to read, comprising sound letters formed from standard English alphabet letters, each sound letter corresponding to a single sound most commonly associated with a particular alphabetic letter or combination of alphabetic letters of said standard alphabet, each said sound letter characterized as having a front, a back, a top, a bottom, a left side and a right side, said sound letters adapted for arrangement in a visually associated, juxtaposed relationship to form combinations of said sound letters so that students are able to read said combinations of said sound letters phonetically.

19 Claims, 5 Drawing Sheets

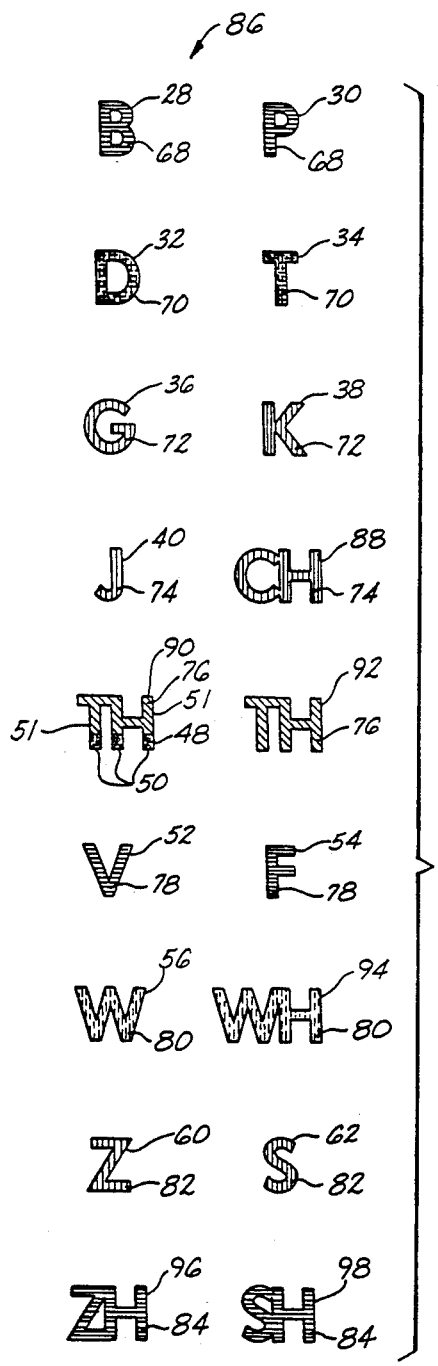
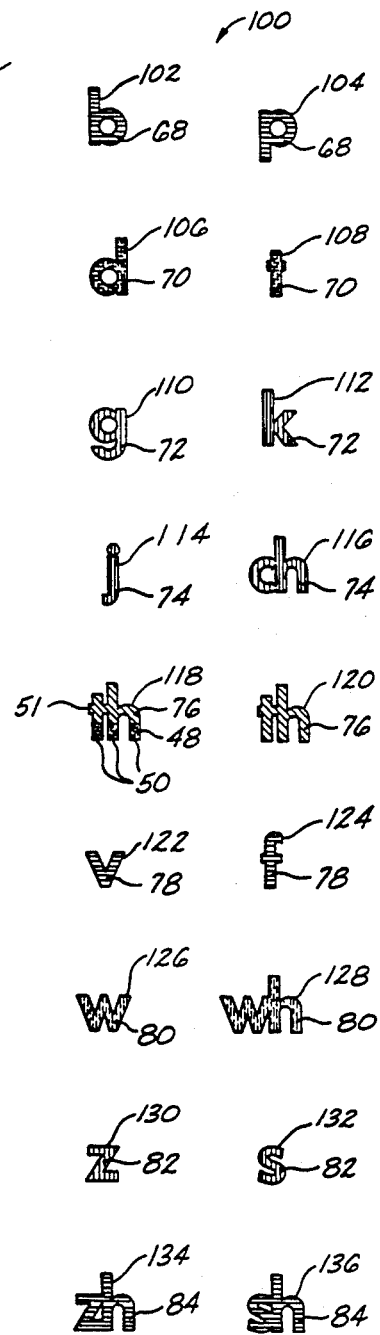
FIG. 3
FIG. 4

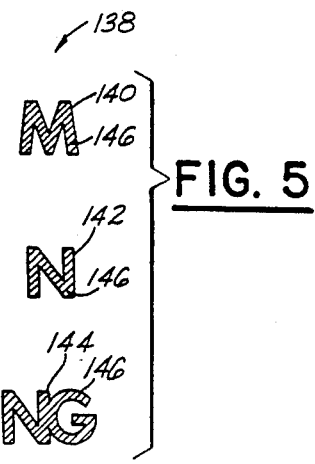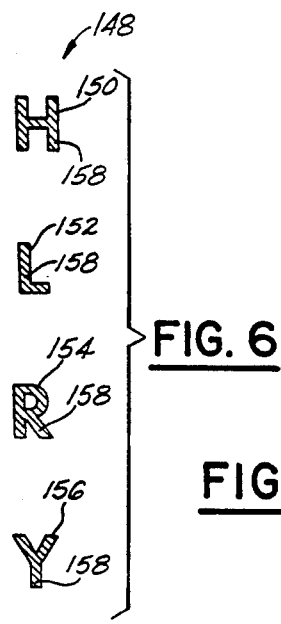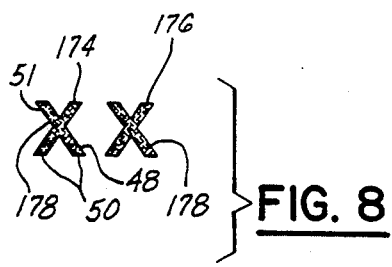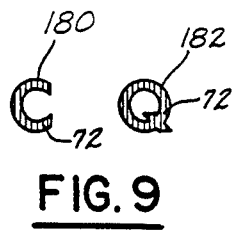
FIG. 5
FIG. 6
FIG. 7
FIG. 8
FIG. 9
FIG. 10

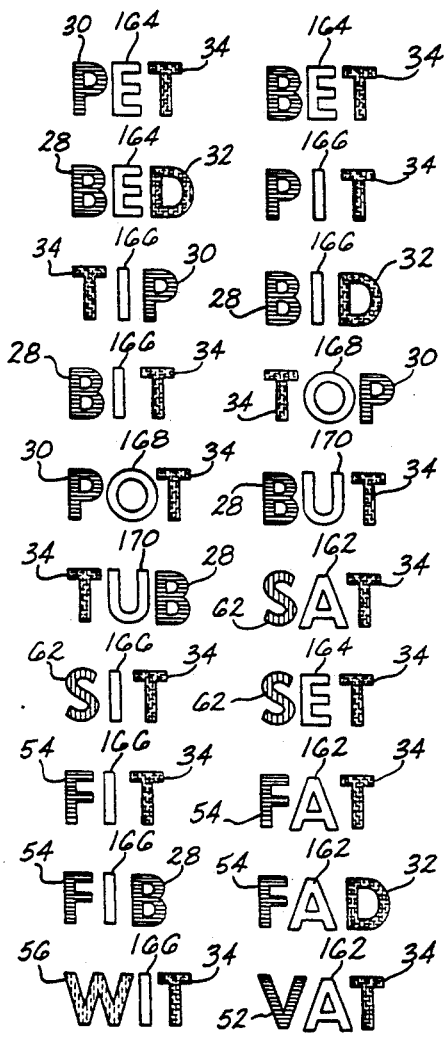
FIG. 11
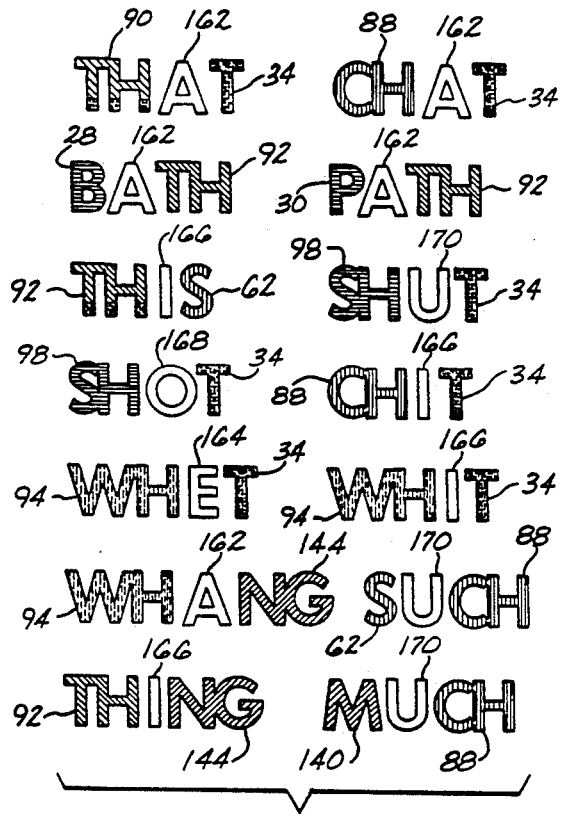
FIG. 12
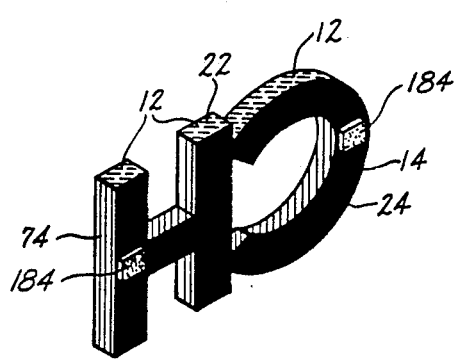
FIG. 13
FIG. 14

METHOD AND APPARATUS FOR TEACHING READING

BACKGROUND OF THE INVENTION

1. Field of the Invention

This invention relates to a method and apparatus for teaching students to read by matching each of the forty-four spoken sounds listed in standard English dictionaries to the letter or letters in the regular twenty-six letter English alphabet which most often spell each sound and more particularly, but not by way of limitation, to thirty-three sound letters formed in the shape and general appearance of regular English alphabet letter or English alphabet letters, thirty-one of the thirty-three sound letters symbolizing phonetically pure and distinctive sounds and two sound letters symbolizing a voiced and unvoiced combination of two of the phonetically pure and distinctive sounds symbolized by the thirty-one sound letters so that students can first learn many words formed from alphabetic letters symbolizing just one phonetically pure and distinctive sound.

2. Discussion

It is well known that the level of American educational performance has declined during the last thirty years. Over one hundred million scores on academic, college, and military entrance tests taken since the College Board started giving Scholastic Aptitude Tests (SAT's) in 1926 and the United States Department of Defense started giving Army General Classification Tests (AGCT's) in 1940 prove, however, that the level of American educational performance has been sinking for sixty years—almost twice as long as most people think.

Before 1929-30, virtually all normal American children learned to read during their first year in school. In common parlance, students learned "phonics". Teachers taught children to read by matching sounds used to form spoken words to letters most often used to spell the sounds. Students learned to write words they heard by substituting letters for sounds and to read words they saw by substituting sounds for letters—even in words students had never seen before. Even dyslexic students and students with poor sight memories learned to read using phonics.

"See and say" reading instruction (also referred to by educators as whole word recognition or sight repetition of whole words) was introduced in the late Twenties. Students learned to read by seeing words printed and reprinted, flashed and re-flashed over and over again. Technicians with instruments for tracking eye movements delivered additional support for whole word recognition proponents. Laboratory records showed that fast-reading adults gobble whole words, whole phrases, sentences, and even whole paragraphs at a glance. Fast adult readers did not pause for "sounding out" letters or syllables. Whole words, the technicians said, are the smallest units good readers recognize.

Educational decision makers of the late Twenties were convinced. Sight repetition of whole words would produce better, faster readers. Further, sight repetition was easier and more fun than phonics, so the students would enjoy learning.

Many big city school districts dropped phonics instruction in the late Twenties and early Thirties and adopted the radically new see and say teaching method. After the introduction of see and say instruction, SAT verbal scores and fourth-grade illiteracy among armed forces recruits (inability to read fourth-grade lessons, the armed forces' line of demarcation between literate recruits and illiterate recruits) declined simultaneously. Between 1941 and 1952, the SAT verbal score average fell twenty-four points—from 500 to 476. Between 1940 and 1953, fourth-grade illiteracy among twenty million armed forces registrants with at least four years of schooling jumped from a negligible 0.4 percent in the World War II draft (1940 to 1945) to seventeen percent in the Korean War draft (1950 to 1953). During the Vietnam War draft (1965 to 1973), fourth-grade illiteracy among armed forces registrants attending at least four years of school jumped to twenty-five percent.

Among World War II recruits having at least four years of schooling, almost all recruits received phonics instruction and almost all were literate. Among Korean War recruits having at least four years of schooling, from one-third to one-half of the recruits received see and say instruction and seventeen percent were rejected as fourth-grade illiterates. Among Vietnam War recruits having at least four years of schooling, over ninety percent received see and say instruction, and about twenty-five percent could not read at the 1940's fourth-grade proficiency level.

During the period from 1964 to 1973, the average SAT verbal score fell over thirty points to 445. Since 1973, the average SAT verbal score dropped to a 1980 low of 424, rose to a post-1962 high of 431 in 1985, then sank to an all-time low of 422 in 1991. The average SAT verbal score in 1992 was a near-low 423.

The number of American adults who cannot read is disturbing, but the increase in the number of American adults who cannot read is more disturbing. In 1930, 1940, and 1950 about 3,000,000 citizens—most of them residents over age fifty who had never been to school—could not read. President Lyndon Johnson said five million—most of them young adults with six to twelve years of schooling—could not read in the early Sixties. In 1970, twelve to seventeen million young adults with at least eight years of school attendance were illiterate. By 1980, the number of non-reading young adults had ballooned to almost thirty million.

In 1990, data from the U.S. Department of Health & Human Services, Justice, Labor, Commerce, and the Census, together with twenty years of scores on U.S. Department of Education tests administered to fourth-grade, eighth-grade, and eleventh-grade students by the National Assessment of Education Progress, indicated thirty-five to forty million Americans could not use a phone book or read road signs, maps, menus, election ballots, can labels, car manuals, nursery rhymes, newspapers, The Bible, The Declaration of Independence, The Constitution of the United States, or directions on a bottle of medicine.

Over ninety-nine percent of public two-year colleges in the United States have remedial reading classes. In the State of Oklahoma, eighty-one percent of students graduating from high school and entering Vocational-Technical (Vo-Tech) schools must first learn to read prior to learning technological skills. About eleven million public school students (one in four) in all grades are doing primary grade school lessons in very small, very expensive, Chapter 1 remedial classes or Special Education classes for the disadvantaged and disabled—although nine of ten enrolled in remedial or Special Education compensatory programs have normal sight, hearing, and intelligence with no diagnosed physical or mental handicaps.

American teachers, parents, and governmental agencies do not realize the catastrophic decline in literacy started during the Thirties rather than during the Sixties. The only event correlating to a decline in literacy beginning sixty years ago is the switch from phonics instruction to whole word recognition instruction.

Professional educators wanted whole word recognition instruction to succeed because phonics instruction presents difficulties. Whole word recognition instructors complain that phonics is difficult to teach because many sounds in the English language are spelled inconsistently. Only thirteen percent of English words do not follow phonetic spelling rules, however, and most of the thirteen percent contain only one maverick syllable spelled in a strange way. Designers of voice recognition computers say eighty-seven percent of English words follow phonetic spelling rules. Beginners can easily learn fifty to sixty common exceptions to phonetic spelling if the beginners first learn 1,000 words which follow the rules.

Too many years of trying and failing to make sight repetition instruction succeed has taken a terrible toll. In three years, students with good sight memories learn to recognize 1200 to 2000 most-used words by the words' shapes. The students learn the 1200 to 2000 most-used words from teachers who say the words over and over again and with readers which use each new word fifteen to twenty times in programmed stories.

But a vocabulary of 1200 to 2000 words is not enough for a third-grade student. In grades 4 through 8, third-grade see and say readers must add at least 20,000 new words to their reading vocabularies in order to read high school textbooks. Teaching 20,000 new words in five school years by see and say instruction is an impossible task. Ironically, one or two unfamiliar words can make nonsense out of paragraphs filled with words that third-grade see and say readers spent three years learning. In contrast, second grade phonics readers can sound out almost any word in a high school textbook. The second grade phonics reader may need definitions for words not in the reader's speaking vocabulary; and the phonics reader may need explanations for comparisons and references. But the phonics reader can read the words.

Sir James Pitman developed an Initial Teaching Alphabet (I.T.A.) in the Sixties to teach children to read by matching sounds with sight. Strictly a teaching tool, the I.T.A. sought to overcome a disparity between sounds children know in their heads and symbols children see on a printed page. The children confront a code, Pitman said, wherein the code is the English language. Over 40 distinct sound units of English are spelled in a variety of ways, and letters appearing in a variety of forms—capital, lower-case, printed, and handwritten—can be baffling.

I.T.A. proponents believed the baffling code of the English language sabotages conventional methods of teaching reading. The "look-say" method (as it was described in Time Magazine) tries to link a visual pattern of a word with the word's meaning, only to run up against confusing variations of form (all three letters of "AND" look different from those of "and," for example).

Also difficult is trying to apply the phonic method, which teaches children to single out letters and their phonemic values so that they can read and spell analytically. In the 26-letter alphabet, one letter often represents different sounds in differing words—for example, the o in gone, one, go, do, women. One sound may also be spelled in different ways—for example, the sound common to I and eye has 22 different spellings in words from aisle to buy to style. Time 83:52 (Apr. 3, 1964).

The I.T.A. erased inconsistencies by linking specific sounds to specific symbols. An all-lower-case alphabet included 44 characters—24 of 26 existing Roman letters (no q or x), plus 20 new letters consisting mostly of typographically linked digraphs. Each of the 44 I.T.A. symbols represents only one sound, and beginning readers can be confident the word seen in print is what the reader says in sound.

The I.T.A. delivered consistency and offered great promise. The Ford Foundation funded an experiment at Lehigh University's reading and study clinic to teach 3,000 children in Pennsylvania, New York, New Jersey, Illinois, Ohio, Minnesota, and California by the new I.T.A. Dr. Albert Mazurkiewicz, director of the Lehigh clinic, predicted nearly all U.S. schools would adopt the new I.T.A. system in time. About 2,500 observers visited Lehigh to learn about the I.T.A. in 1964.

Despite its consistency, the I.T.A. also has problems. Students having good sight memories learn a phonetically correct but alphabetically incorrect spelling. After an initial flurry of activity and interest, the I.T.A. was not adopted by U.S. schools and is all but forgotten. The United States is left with almost thirty million illiterate adults.

SUMMARY OF THE INVENTION

The present invention provides a method and apparatus for teaching students to read phonetically. Three-dimensional sound letters are formed in the shapes of standard English alphabet letters, each sound letter symbolizing and corresponding to a single sound most commonly associated with a particular alphabetic letter or combination of alphabetic letters of the standard alphabet. In a presently preferred embodiment, each sound letter bears an indicia so that proper orientation of the sound letters is readily determinable, even by dyslexic students. The sound letters are adapted for arrangement in a visually associated, juxtaposed relationship to form combinations so that students are able to read the combinations of sound letters phonetically as words.

An object of the present invention is to provide an aid for teaching reading so that a single sound of the English language is matched to a sound letter formed from the standard English alphabet.

Another object of the present invention, while accomplishing the above stated object, is to provide an aid for teaching reading phonetically so that students learn how sound letters are united in a systematic and logical fashion to form words.

Yet another object of the present invention, while accomplishing the above stated objects, is to provide an aid for teaching phonics to students, the aid including sound letters coded for proper orientation so that students suffering from dyslexia can reproduce the correct orientation for each sound letter and thereby learn to read more easily.

Yet another object of the present invention, while accomplishing the above stated objects, is to provide a method and apparatus for teaching phonics to students so that students quickly acquire a basic reading vocabulary sufficient to enable the student to read words and sentences.

Yet another object of the present invention, while accomplishing the above stated objects, is to provide a method and apparatus for teaching phonics to students so that non-reading and poorly reading parents of students learn to read while teaching their children.

Yet another object of the present invention, while accomplishing the above stated objects, is to provide a method and apparatus for teaching phonics to students so that students as young as three years of age can learn to read by understanding how sounds of the English language are made and how the sounds relate to alphabetic letters of the standard English alphabet.

Yet another object of the present invention, while accomplishing the above stated objects, is to provide a method and apparatus for teaching reading to students so that students from all ethnic backgrounds, including students whose first language does not include certain sounds of the English language, are able to learn how sounds of the English language are made and how the sounds relate to alphabetic letters of the standard English alphabet.

Other objects, features, and advantages of the present invention will become apparent from the following detailed description when read in conjunction with the drawings and appended claims.

BRIEF DESCRIPTION OF THE DRAWINGS

FIG. 3 is a front view of nine pairs of consonant sound letters of a first alternate embodiment of the present invention;

FIG. 4 is a front view of nine pairs of consonant sound letters of a second alternate embodiment of the present invention;

FIG. 5 is a front view of nasal consonant sound letters of the present invention;

FIG. 6 is a front view of residual consonant sound letters of the present invention;

FIG. 7 is a front view of standard short vowel sound letters of the present invention;

FIG. 8 is a front view of multiple consonant sound letters of the present invention;

FIG. 9 is a front view of consonant sound letters C and Q of the present invention;

FIG. 10 is a front view of sound letters of the present invention arranged to produce words;

FIG. 11 is like FIG. 10;

FIG. 12 is like FIG. 10 and illustrates sound letters formed in the shape of two alphabetic letters joined together to form a single sound letter arranged in combination with sound letters formed in the shape of a single alphabetic letter;

FIG. 13 is a pictorial view of a sound letter of the present invention;

FIG. 14 is a rear pictorial view of a sound letter of the present invention.

DETAILED DESCRIPTION

Figure 1:
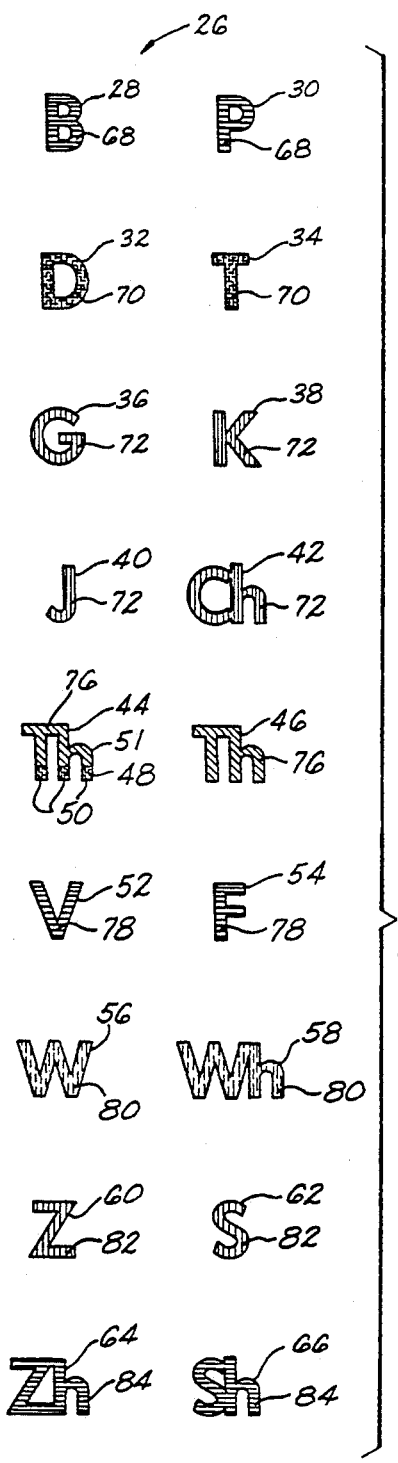
FIG. 1 is a front view of nine pairs of consonant sound letters of the present invention.

Referring now to the drawings generally, sound letters of the present invention are depicted in FIGS. 1-9. FIGS. 13-14 depict three-dimensional sound letters having a top 12, a back 14, a front 16, a left side 18, a right side 20, and a bottom (not shown). The top 12 of each sound letter is indicated by a first indicia 22, and the back of each sound letter is indicated by a second indicia 24.

Referring now to FIGS. 13 and 14, the first indicia 22 of the top 12 of each sound letter and the second indicia 24 of the back 14 of each sound letter permit a student to easily determine proper orientation of each sound letter. In the presently preferred embodiment, the first indicia 22 is a shade of gray, and the second indicia 24 is black. It will be understood to one skilled in the art, however, that a first mechanical protrusion, e.g., a small bump, could be used to indicate the top 12 of each sound letter and, likewise, a second mechanical protrusion, e.g., two small bumps, could be used to indicate the back 14 of each sound letter.

Referring now to FIG. 1, nine pairs of consonant sound letters 26 are depicted. In each pair of consonant sound letters, a sound letter symbolizing a voiced consonant sound is paired with a consonant sound letter symbolizing an unvoiced consonant sound. The voiced consonant sound and the unvoiced consonant sound of each pair are matched according to similarity in pronunciation, i.e., the sounds are produced by identical placement and movement of lips, tongue, teeth, and jaw. Voiced consonant sounds require participation of the larynx; unvoiced consonant sounds do not utilize the larynx.

Sound letters 28 and 30 form a first of pair of consonant sound letters symbolizing a first pair of voiced and unvoiced consonant sounds.

28 is a sound letter B having a shape and general appearance of an upper case alphabetic letter B and symbolizing a voiced consonant sound associated with the alphabetic letter B in the word BAD; and 30 is a sound letter P having a shape and general appearance of an upper case alphabetic letter P and symbolizing an unvoiced sound associated with the alphabetic letter P in the word PAD.

Still referring to FIG. 1, sound letters 32 and 34 form a second pair of consonant sound letters symbolizing a second pair of voiced and unvoiced consonant sounds.

32 is a sound letter D having a shape and general appearance of an upper case alphabetic letter D and symbolizing a voiced consonant sound associated with the alphabetic letter D in the word DAD; and 34 is a sound letter T having a shape and general appearance of an upper case alphabetic letter T and symbolizing a voiced consonant sound associated with the alphabetic letter T in the word TAD.

Still referring to FIG. 1, sound letters 36 and 38 form a third pair of consonant sound letters symbolizing a third pair of voiced and unvoiced consonant sounds.

36 is a sound letter G having a shape and general appearance of an upper case alphabetic letter G and symbolizing a voiced consonant sound associated with the alphabetic letter G in the word GAB; and 38 is a sound letter K having a shape and general appearance of an upper case alphabetic letter K and symbolizing an unvoiced consonant sound associated with the alphabetic letter K in the word KATE, the alphabetic letter Q in the word QUAKE, and the alphabetic letter C in the word CAKE.

Still referring to FIG. 1, sound letters 40 and 42 form a fourth pair of consonant sound letters symbolizing a fourth pair of voiced and unvoiced consonant sounds.

40 is a sound letter J having a shape and general appearance of an upper case alphabetic letter J and symbolizing a voiced consonant sound associated with the alphabetic letter J in the word JAM; and 42 is a sound letter Ch having a shape and general appearance of an upper case alphabetic letter C joined to a lower case alphabetic letter H and symbolizing an unvoiced consonant sound associated with a combination of the alphabetic letter C and the alphabetic letter h in the word CHEER.

Still referring to FIG. 1, sound letters 44 and 46 form a fifth pair of consonant sound letters symbolizing a fifth pair of voiced and unvoiced consonant sounds.

44 is a sound letter Th-bar having a shape and general appearance of an upper case alphabetic letter T joined to a lower case alphabetic letter h, the sound letter Th-bar symbolizing a voiced consonant sound associated with a combination of the alphabetic letter T and the alphabetic letter h in the word THEN;

46 is a sound letter TH having a shape and general appearance of an upper case alphabetic letter T joined to a lower case alphabetic letter h, the sound letter TH symbolizing an unvoiced consonant sound associated with a combination of the alphabetic letter T and the alphabetic letter h in the word THIN; and 48 is a third indicia applied to the sound letter Th-bar to distinguish the sound letter Th-bar 44 symbolizing a voiced constant sound from the sound letter Th 46 symbolizing an unvoiced consonant sound.

The sound letter Th-bar has an upper portion 51 and a lower portion 50. In the presently preferred embodiment, the third indicia 48 is a horizontal yellow stripe applied to the lower portion 50 of the sound letter Th-bar 44. It will be understood to one skilled in the art that the third indicia 48 can be of any form which provides a visual difference between the sound letter Th-bar and the sound letter Th 46.

Still referring to FIG. 1, sound letters 52 and 54 form a sixth pair of consonant sound letters symbolizing a sixth pair of voiced and unvoiced consonant sounds.

52 is a sound letter V having a shape and general appearance of an upper case alphabetic letter V and symbolizing a voiced consonant sound associated with the alphabetic letter V and symbolizing a voiced constant sound associated with the alphabetic letter V in the word VAN; and 54 is a sound letter F having a shape and general appearance of an upper case alphabetic letter F and symbolizing an unvoiced consonant sound associated with the alphabetic letter F in the word VAN.

Still referring to FIG. 1, sound letters 56 and 58 form a seventh pair of consonant sound letters symbolizing a seventh pair of voiced and unvoiced consonant sounds.

56 is a sound letter W having a shape and general appearance of an upper case alphabetic letter W and symbolizing a voiced consonant sound associated with the alphabetic letter W in the word WET; and 58 is a sound letter Wh having a shape and general appearance of an upper case alphabetic letter W joined to a lower case alphabetic letter h and symbolizing an unvoiced consonant sound associated with a combination of the alphabetic letter W and the alphabetic letter h in the word WHET.

Still referring to FIG. 1, sound letters 60 and 62 form an eighth pair of consonant sound letters symbolizing an eighth pair of voiced and unvoiced consonant sounds.

60 is a sound letter Z having a shape and general appearance of an upper case alphabetic letter Z and symbolizing a voiced consonant sound associated with the alphabetic letter Z in the word ZIP; and 62 is a sound letter S having a shape and general appearance of an upper case alphabetic letter S and symbolizing an unvoiced consonant sound associated with the alphabetic letter S in the word SIP.

Still referring to FIG. 1, sound letters 64 and 66 form a ninth pair of consonant sound letters symbolizing a ninth pair of voiced and unvoiced sounds.

64 is a sound letter Zh having a shape and general appearance of an upper case alphabetic letter Z joined to a lower case alphabetic letter h and symbolizing a voiced consonant sound associated with a combination of the alphabetic letter Z and the alphabetic letter h in the word ZHIVAGO; and 66 is a sound letter Sh having a shape and general appearance of an upper case alphabetic letter S joined to a lower case alphabetic letter h, the sound letter Sh symbolizing an unvoiced consonant sound associated with a combination of the alphabetic letter S and the alphabetic letter h in the word SHIN.

The voiced consonant sound symbolized by the sound letter Zh 64 is more commonly found in words such as "azure", "collision", "mirage", "equation", "treasure", and "casual".

Still referring to FIG. 1, each of the nine pairs of consonant sound letters bears a different indicia.

Sound letter B 28 and sound letter P 30 have a fourth indicia 68;

Sound letter D 32 and sound letter T 34 have a fifth indicia 70;

Sound letter G 36 and sound letter K 38 have a sixth indicia 72;

Sound letter J 40 and sound letter Ch 42 have a seventh indicia 74;

Sound letter Th-bar and sound letter Th 46 have an eighth indicia 76;

Sound letter V 52 and sound letter F 54 have a ninth indicia 78;

Sound letter W and sound letter Wh 58 have a tenth indicia 80;

Sound letter Z 60 and sound letter S 62 have an eleventh indicia 82; and

Sound letter Zh 64 and sound letter Sh 66 have a twelfth indicia 84.

In the presently preferred embodiment of FIG. 1, the fourth indicia 68, the ninth indicia 78, and the twelfth indicia 84 are different shades of blue. The sixth indicia 72, the seventh indicia 74, and the eleventh indicia 82 are different shades of red (pink). The fifth indicia 70 is a shade of yellow, and the tenth indicia 80 is a shade of violet.

While the presently preferred embodiment utilizes different colors as indicia, it will be understood to one skilled in the art that other indicia, e.g., stripes, spots, diagonal lines, etc., can be substituted for the indicia of the presently preferred embodiment.

Figure 2:
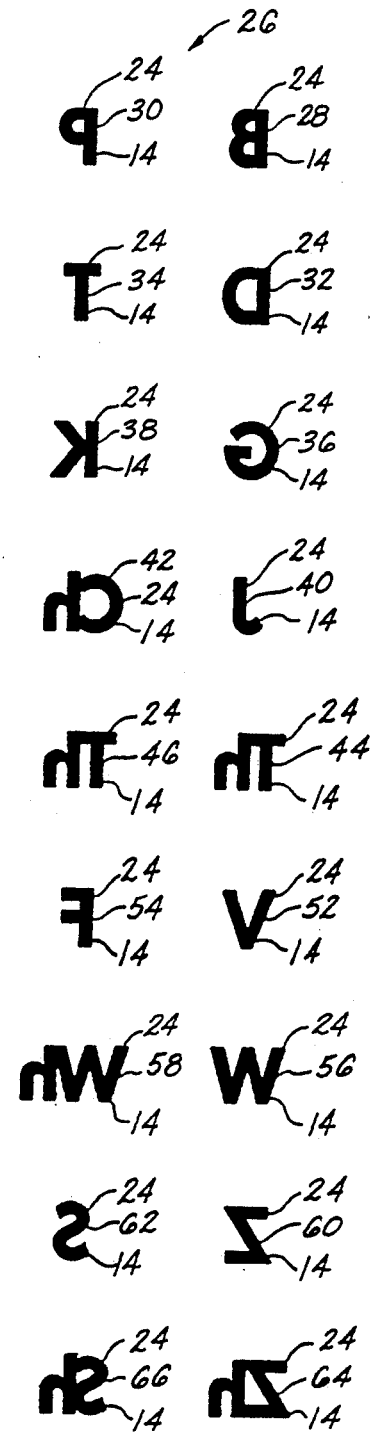
FIG. 2 is a rear view of the nine pairs of consonant sound letters of FIG. 1.

Referring now to FIG. 2, the nine pairs of consonant sound letters 26 of FIG. 1 are depicted. The back 14 of each sound letter 28, 30, 32, 34, 36, 38, 40, 42, 44, 46, 52, 54, 56, 58, 60, 62, 64, and 66 bears the second indicia 24. In the presently preferred embodiment the second indicia 24 is black.

Referring now to FIG. 3, a first alternate embodiment of the present invention includes nine pairs of consonant sound letters 86. The consonant sound letters 86 of the first alternate embodiment of FIG. 3 have a shape and general appearance of upper case alphabetic letters. A sound letter CH 88 is like sound letter Ch (See FIGS. 1 and 2), in that the sound letter CH 88 symbolizes an unvoiced consonant sound associated with a combination of the alphabetic letter C and the alphabetic letter H in the word CHEER. The sound letter CH 88 has a general shape and appearance of an upper case alphabetic letter C joined with an upper case alphabetic letter H.

Still referring to FIG. 3, a sound letter TH-bar 90 has a general shape and appearance of an upper case alphabetic letter T joined to an upper case alphabetic letter H. The sound letter TH-bar 90, like the sound letter Th-bar 44, symbolizes a voiced consonant sound associated with a combination of the alphabetic letter T and the alphabetic letter H in the word THEN. A sound letter TH 92 has a general shape and appearance of an upper case alphabetic letter T joined to an upper case alphabetic letter H. The sound letter TH 92, like the sound letter Th 46, symbolizes an unvoiced consonant sound associated with a combination of the alphabetic letter T and the alphabetic letter H in the word THIN.

In the first alternate embodiment illustrated in FIG. 3, the third indicia 48 is applied to the lower portion 50 of the sound letter TH-bar 90 to provide a visual difference between the voiced consonant sound letter TH-bar 90 and the unvoiced consonant sound letter TH 92.

Still referring to FIG. 3, a sound letter WH 94 has a shape and general appearance of an upper case alphabetic letter W joined to an upper case alphabetic letter H. The sound letter WH 94, like the sound letter 58, symbolizes an unvoiced consonant sound associated with a combination of the alphabetic letter W and the alphabetic letter H in the word WHET.

Still referring to FIG. 3, a sound letter ZH 96 has a shape and general appearance of an upper case alphabetic letter Z joined to an upper case alphabetic letter H. The sound letter ZH 96, like the sound letter Zh 64, symbolizes a voiced consonant sound associated with a combination of the alphabetic letter Z and the alphabetic letter H in the word ZHIVAGO.

Still referring to FIG. 3, a sound letter SH 98 has a shape and general appearance of an upper case alphabetic letter S joined to an upper case alphabetic letter H. The sound letter SH 98, like the sound letter Sh 66, symbolizes an unvoiced consonant sound associated with a combination of the alphabetic letter S and the alphabetic letter H in the word SHIN.

The sound letters B 28, P 30, D 32, T 34, G 36, K 38, J 40, V 52, F 54, W 56, Z 60, and S 62 of FIG. 3 also appear in FIG. 1. Students first learn both upper case letters and lower case letters of the standard English alphabet. The presently preferred embodiment of FIG. 1 combines upper case alphabetic letters and lower case alphabetic letters to form sound letters symbolized by two alphabetic letters in combination, whereas the first alternate embodiment of FIG. 3 uses only upper case alphabetic letters to form sound letters symbolized by two alphabetic letters in combination. It will be understood to one skilled in the art that upper case alphabetic letters in combination with lower case alphabetic letters permit a student to learn from sound letters which match first words of sentences appearing in beginning readers.

Referring now to FIG. 4, a second alternate embodiment of the present invention includes nine pairs of consonant sound letters 100. The consonant sound letters 100 of the second alternate embodiment of FIG. 4 have a shape and general appearance of lower case alphabetic letters. In each pair of consonant sound letters, a sound letter symbolizing a voiced consonant sound is paired with a consonant sound letter symbolizing an unvoiced consonant sound. The voiced consonant sound and the unvoiced consonant sound of each pair are matched according to similarity in pronunciation, i.e., the sounds are produced by identical placement and movement of lips, tongue, teeth, and jaw. Voiced consonant sounds require participation of the larynx; unvoiced consonant sounds do not utilize the larynx.

Sound letters 102 and 104 form a first of pair of consonant sound letters symbolizing a first pair of voiced and unvoiced consonant sounds.

102 is a sound letter b having a shape and general appearance of a lower case alphabetic letter b and symbolizing a voiced consonant sound associated with the alphabetic letter b in the word BAD; and 104 is a sound letter p having a shape and general appearance of a lower case alphabetic letter p and symbolizing an unvoiced sound associated with the alphabetic letter p in the word PAD.

Still referring to FIG. 4, sound letters 106 and 108 form a second pair of consonant sound letters symbolizing a second pair of voiced and unvoiced consonant sounds.

106 is a sound letter d having a shape and general appearance of a lower case alphabetic letter d and symbolizing a voiced consonant sound associated with the alphabetic letter d in the word DAD; and 108 is a sound letter t having a shape and general appearance of a lower case alphabetic letter t and symbolizing a voiced consonant sound associated with the alphabetic letter t in the word TAD.

Still referring to FIG. 4, sound letters 110 and 112 form a third pair of consonant sound letters symbolizing a third pair of voiced and unvoiced consonant sounds.

110 is a sound letter g having a shape and general appearance of a lower case alphabetic letter g and symbolizing a voiced consonant sound associated with the alphabetic letter g in the word GAB; and 112 is a sound letter k having a shape and general appearance of a lower case alphabetic letter k and symbolizing an unvoiced consonant sound associated with the alphabetic letter k in the word KIT, the alphabetic letter q in the word QUAKE, and the alphabetic letter c in the word CAKE.

Still referring to FIG. 4, sound letters 114 and 116 form a fourth pair of consonant sound letters symbolizing a fourth pair of voiced and unvoiced consonant sounds.

114 is a sound letter j having a shape and general appearance of a lower case alphabetic letter j and symbolizing a voiced consonant sound associated with the alphabetic letter j in the word JAM; and 116 is a sound letter ch having a shape and general appearance of a lower case alphabetic letter c joined to a lower case alphabetic letter h and symbolizing an unvoiced consonant sound associated with a combination of the alphabetic letter c and the alphabetic letter h in the word CHEER.

Still referring to FIG. 4, sound letters 118 and 120 form a fifth pair of consonant sound letters symbolizing a fifth pair of voiced and unvoiced consonant sounds.

118 is a sound letter th-bar having a shape and general appearance of a lower case alphabetic letter t joined to a lower case alphabetic letter h, the sound letter th-bar symbolizing a voiced consonant sound associated with a combination of the alphabetic letter t and the alphabetic letter h in the word THEN;

120 is a sound letter th having a shape and general appearance of a lower case alphabetic letter t joined to a lower case alphabetic letter h, the sound letter th symbolizing an unvoiced consonant sound associated with a combination of the alphabetic letter t and the alphabetic letter h in the word THIN; and 48 is a third indicia applied to the sound letter th-bar 118 to distinguish the sound letter th-bar 118 symbolizing a voiced consonant sound from the sound letter th 120 symbolizing an unvoiced consonant sound.

The sound letter th-bar 118 has an upper portion 51 and a lower portion 50. In the presently preferred embodiment, the third indicia 48 is a horizontal yellow stripe applied to the lower portion 50 of the sound letter th-bar 118. It will be understood to one skilled in the art that the third indicia 48 can be of any form which provides a visual difference between the sound letter th-bar 118 and the sound letter th 120.

Still referring to FIG. 4, sound letters 122 and 124 form a sixth pair of consonant sound letters symbolizing a sixth pair of voiced and unvoiced consonant sounds.

122 is a sound letter v having a shape and general appearance of a lower case alphabetic letter v and symbolizing a voiced consonant sound associated with the alphabetic letter v in the word VAN; and 124 is a sound letter f having a shape and general appearance of a lower case alphabetic letter f and symbolizing an unvoiced consonant sound associated with the alphabetic letter f in the word FAN.

Still referring to FIG. 4, sound letters 126 and 128 form a seventh pair of consonant sound letters symbolizing a seventh pair of voiced and unvoiced consonant sounds.

126 is a sound letter w having a shape and general appearance of a lower case alphabetic letter w and symbolizing a voiced consonant sound associated with the alphabetic letter w in the word WET; and 128 is a sound letter wh having a shape and general appearance of a lower case alphabetic letter w joined to a lower case alphabetic letter h and symbolizing an unvoiced consonant sound associated with a combination of the alphabetic letter w and the alphabetic letter h in the word WHET.

Still referring to FIG. 4, sound letters 130 and 132 form an eighth pair of consonant sound letters symbolizing an eighth pair of voiced and unvoiced consonant sounds.

130 is a sound letter z having a shape and general appearance of a lower case alphabetic letter z and symbolizing a voiced consonant sound associated with the alphabetic letter z in the word ZIP; and 132 is a sound letter s having a shape and general appearance of a lower case alphabetic letter s and symbolizing an unvoiced consonant sound associated with the alphabetic letter s in the word SIP.

Still referring to FIG. 4, sound letters 134 and 136 form a ninth pair of consonant sound letters symbolizing a ninth pair of voiced and unvoiced sounds.

134 is a sound letter zh having a shape and general appearance of a lower case alphabetic letter z joined to a lower case alphabetic letter h and symbolizing a voiced consonant sound associated with a combination of the alphabetic letter z and the alphabetic letter h in the word ZHIVAGO; and 136 is a sound letter sh having a shape and general appearance of a lower case alphabetic letter s joined to a lower case alphabetic letter h, the sound letter sh symbolizing an unvoiced consonant sound associated with a combination of the alphabetic letter s and the alphabetic letter h in the word SHIN.

The voiced consonant sound symbolized by the sound letter zh 134 is more commonly found in words such as "azure", "collision", "mirage", "equation", "treasure", and "casual".

Still referring to FIG. 4, each of the nine pairs of consonant sound letters bears a different indicia.

Sound letter b 102 and sound letter p 104 have a fourth indicia 68;

Sound letter d 106 and sound letter t 108 have a fifth indicia 70;

Sound letter g 110 and sound letter k 112 have a sixth indicia 72;

Sound letter j 114 and sound letter ch 116 have a seventh indicia 74;

Sound letter th-bar 118 and sound letter th 120 have an eighth indicia 76;

Sound letter v 122 and sound letter f 124 have a ninth indicia 78;

Sound letter w 126 and sound letter wh 128 have a tenth indicia 80;

Sound letter z 130 and sound letter s 132 have an eleventh indicia 82; and

Sound letter zh 134 and sound letter sh 136 have a twelfth indicia 84.

Referring now to FIG. 5, nasal consonant sound letters 138 are depicted.

140 is a sound letter M having a shape and general appearance of an upper case alphabetic letter M and symbolizing a nasal consonant sound associated with the alphabetic letter M in the word MAP.

142 is a sound letter N having a shape and general appearance of an alphabetic letter N and symbolizing a nasal consonant sound associated with the alphabetic letter N in the word NAP.

144 is a sound letter NG having a shape and general appearance of an upper case alphabetic letter N joined to an upper case alphabetic letter G and symbolizing a nasal consonant sound associated with a combination of the alphabetic letter N and the alphabetic letter G in the word SING.

The nasal consonant sound letters 140, 142, 144 bear a thirteenth indicia 146. In the presently preferred embodiment, the thirteenth indicia 146 is a shade of brown.

Referring now to FIG. 6, residual consonant sound letters 148 are depicted. The residual consonant sound letters 148 symbolize less restricted, more free-flowing consonant sounds associated with alphabetic letters H, L, R, and Y when the alphabetic letters H, L, R, and Y appear at the beginning of words and syllables.

150 is a sound letter H having a shape and general appearance of an upper case alphabetic letter H and symbolizing a consonant sound associated with the alphabetic letter H in the word HIP.

152 is a sound letter L having a shape and general appearance of an upper case alphabetic letter L. The sound letter L 152 symbolizes a consonant sound associated with the alphabetic letter L in the word LIP.

154 is a sound letter R having a shape and general appearance of an upper case alphabetic letter R. The sound letter R 154 symbolizes a consonant sound associated with the alphabetic letter R in the word RIP.

156 is a sound letter Y having a shape and general appearance of an upper case alphabetic letter Y. The sound letter Y 156 symbolizes a consonant sound associated with the alphabetic letter Y in the word YIP.

158 is a fourteenth indicia common to the residual consonant sound letters 148. In the presently preferred embodiment, the fourteenth indicia 158 is a shade of green.

Referring now to FIG. 7, standard short vowel sound letters 160 symbolizing standard short vowel sounds of standard alphabet letters A, E, I, O, and U are depicted.

162 is a sound letter A having a shape and general appearance of an upper case alphabetic letter A. The sound letter A 162 symbolizes a sound associated with the alphabetic letter A in the word BAD.

164 is a sound letter E having a shape and general appearance of an upper case alphabetic letter E. The sound letter E 164 symbolizes the sound associated with the alphabetic letter E in the word BED.

166 is a sound letter I having a shape and general appearance of an upper case alphabetic letter I. The sound letter I 166 symbolizes the sound associated with the alphabetic letter I in the word BID.

168 is a sound letter O having a shape and general appearance of an upper case alphabetic letter O. The sound letter O 168 symbolizes the sound associated with the alphabetic letter O in the word BOB.

170 is a sound letter U having a shape and general appearance of an upper case alphabetic letter U. The sound letter U 170 symbolizes the sound associated with the alphabetic letter U in the word BUD.

172 is a fifteenth indicia common to the standard short vowel sound letters 160. In the presently preferred embodiment, the fifteenth indicia 172 is white.

Referring now to FIG. 8, multiple consonant sound letter X-bar 174 and multiple consonant sound letter X 176 are depicted.

The multiple consonant sound letter X-bar 174 has a shape and general appearance of an upper case alphabetic letter X and symbolizes the multiple voiced consonant sounds associated with the sound letter G 36 and the sound letter Z 60 as found in the word EXIT (pronounced EGZIT).

The sound letter X 176 has a shape and general appearance of an upper case alphabetic letter X and symbolizes the multiple unvoiced consonant sounds associated with the sound letter K 38 and the sound letter S 62 as found in the words EXTRA (pronounced EKSTRA) and BOX (pronounced BOKS).

The third indicia 48 distinguishes the multiple consonant sound letter X-bar 174 symbolizing multiple voiced consonant sounds from the multiple consonant sound letter X 176 symbolizing multiple unvoiced consonant sounds. The multiple consonant sound letter X-bar 174 has an upper portion 51 and a lower portion 50. In the presently preferred embodiment, the third indicia 48 appears in the lower portion 50 of the multiple consonant sound letter X-bar 174 as a horizontal yellow stripe. It will be understood to one skilled in the art that the third indicia 48 can be of any form which provides a visual difference between the sound letter X-bar 174 and the sound letter X 176.

A sixteenth indicia 178 is common to the upper portion 51 of the multiple consonant sound letter X-bar 174 and to the multiple consonant sound letter X 176. In the presently preferred embodiment the sixteenth indicia 178 is a shade of orange.

Referring now to FIG. 9, a consonant sound letter C 180 has a shape and general appearance of an upper case alphabetic letter C and symbolizes the sound symbolized by the sound letter K 38. A consonant sound letter Q 182 has a shape and general appearance of an upper case alphabetic letter Q and, like the sound letter C 180, symbolizes the sound symbolized by the sound letter K 38.

The consonant sound letter C 180 and the consonant sound letter Q 182 do not symbolize additional sounds not otherwise symbolized by the sound letters of the present invention. When the alphabetic letter C precedes vowels other than the vowel I or the vowel E, the alphabetic letter symbolizes a sound associated with the alphabetic letter C in the word CEREAL. The alphabetic letter C appears most often in the English language prior to the vowel A, the vowel O, or the vowel U, however. When the alphabetic letter C precedes the vowel A, the vowel O, or the vowel U, the alphabetic letter C symbolizes a sound associated with the alphabetic letter C in the word CAKE. The consonant sound letter C 180 of the present invention symbolizes only the sound symbolized by the alphabetic letter C in the word CAKE. The sound symbolized by the consonant sound letter C 180 is identical, therefore, to the sound symbolized by the consonant sound letter K 38 of the present invention.

The consonant sound letter Q 182, like the consonant sound letter C 180, symbolizes the sound symbolized by the consonant sound letter K 38 of the present invention. The alphabetic letter Q appears in the English language most often in combination with an alphabetic letter U, e.g., "QUIT", "QUICK", etc.

It will be understood to one skilled in the art that nasal sound letters 138, the residual consonant sound letters 148, standard short vowel sound letters 160, multiple consonant sound letters 174 and 176, consonant sound letter C 180, and consonant sound letter Q 182 formed in the shape and general appearance of lower case alphabetic letters are within the spirit and scope of the present invention. It will be further understood to one skilled in the art that nasal sound letters 138, the residual consonant sound letters 148, standard short vowel sound letters 160, multiple consonant sound letters 174 and 176, consonant sound letter C 180, and consonant sound letter Q 182 formed in the shape and general appearance of lower case alphabetic letters are within the spirit and scope of the present invention.

Referring now to FIG. 14, magnets 184 attached to the sound letter CH 88 are illustrated. The magnets 184 can be attached to the sound letter CH 88 by adhesive (not shown) or by screws (not shown). The magnets 184 permit the sound letters to be arranged and displayed on a magnetic surface. It will be understood to one skilled in the art that other means of attaching the sound letters to a surface, such as Velcro and eyelets suited for hanging on a nail, are within the intent and scope of the present invention.

Figure 15:
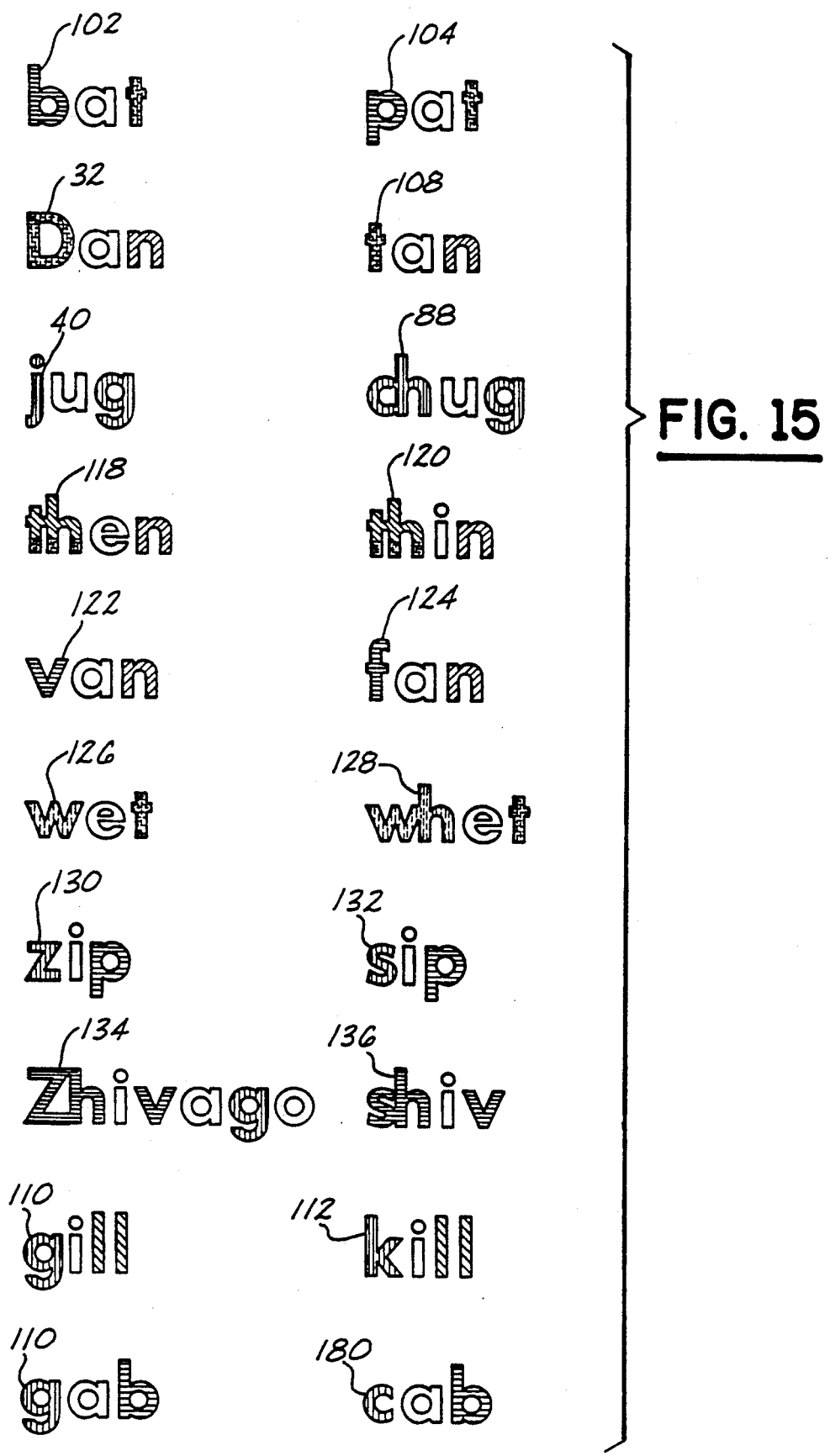
FIG. 15 illustrates a set of words used to teach the sounds of nine pairs of voiced and unvoiced consonants of the present invention.

Referring now to FIG. 15, a group of words symbolized by the nine pairs of consonant sound letters is illustrated. Except for the sound letter D 32 (FIG. 1) in the word DAN and the sound letter Zh 64 (FIG. 1), the sound letters arranged to symbolize words in FIG. 15 are the consonant sound letters depicted in FIG. 4.

A student is supplied with sound letters 28, 30, 32, 34, 36, 38, 40, 42, 44, 46, 52, 54, 56, 58, 60, 52, 64, and 66 of the nine pairs of consonant sound letters 26 of the present invention. The nine matched pairs of sound letters 26 symbolize voiced and unvoiced consonants, the voiced and unvoiced consonant of each pair pronounced with identical placement and movement of lips, tongue, teeth, and jaw. Each pair is painted in one of nine different colors. The sound letter Th-bar 44, symbolizing a voiced consonant sound commonly associated with the alphabetic combination "Th" in the word THEN, bears a yellow bar to distinguish the sound letter Th-bar 44 from the sound letter Th symbolizing the unvoiced consonant sound commonly associated with the alphabetic combination "Th" in the word THIN. The back 14 of each sound letter is black, and the top 12 of each sound letter is gray.

The student first learns to distinguish voiced sounds from unvoiced sounds and the difference between free flowing vowel sounds and restricted consonant sounds. The teacher, using words generally a part of the student's spoken vocabulary, instructs the student to touch the student's larynx while the student makes a particular sound. The student feels vibrations within the larynx when the student makes a voiced sound. The student detects no vibration of the larynx when the student makes an unvoiced sound. The words symbolized by sound letters in FIG. 11-12 illustrate the words which the teacher might select to teach the student the difference between free-flowing vowel sounds and restricted consonant sounds.

The teacher then selects one of the pairs of voiced and unvoiced consonant sounds which are pronounced with identical placement and movement of the student's lips, tongue, teeth, and jaw. For example, the teacher may ask the student to put a sound letter B in one hand and a sound letter P in the student's other hand. The teacher slowly reads rhyming words beginning with the consonant sounds associated with alphabetic letters B and P, e.g., BIG & PIG, BEST & PEST, PIT & BIT, BEACH & PEACH, PILL & BILL, and so on—until the student always holds up the sound letter matching the initial sound in each word. The teacher follows the same procedure with another pair of matched consonant sounds, e.g., D & T. FIG. 15 illustrates words used to teach a student the pairs of voiced and unvoiced consonant sounds by the method of the present invention.

The student learns to match alphabetic letters with at least two pairs of voiced and unvoiced consonant sounds. The voiced and unvoiced consonant sounds are from a group of the sound associated with the alphabetic letter b in the word BAD and the sound associated with the alphabetic letter p in the word PAD; the sound associated with the alphabetic letter D in the word DAD and the sound associated with the alphabetic letter t in the word TAD; the sound associated with the alphabetic letter g in the word GILL and the sound associated with the alphabetic letter k in the word "kill"; the sound associated with the alphabetic letter j in the word JUG and the sound associated with the alphabetic letter combination ch in the word CHUG; the sound associated with the alphabetic letter combination th in the word THEN and the sound associated with the alphabetic letter combination th in the word THIN; the sound associated with the alphabetic letter v in the word VAN and the sound associated with the alphabetic letter f in the word FAN; the sound associated with the alphabetic letter w in the word WET and the sound associated with the alphabetic letter combination wh in the word WHET; the sound associated with the alphabetic letter z in the word ZIP and the sound associated with the alphabetic letter s in the word SIP; and the sound associated with the alphabetic letter combination Zh in the word ZHIVAGO and the sound associated with the alphabetic letter combination sh in the word SHIV.

As soon as the student can identify and spell all of the consonants sounds from the nine pairs of voiced and unvoiced consonant sounds except the ZH sound, the student can start reading words having three sounds using the standard short vowel sounds found in BAG, BEG, BIG, BOG, AND BUG. The standard short vowel sound letters are utilized in the same way as consonant sound letters, i.e., the teacher speaks a word containing a short vowel sound and asks the student to identify the short vowel sound in the word by holding up the appropriate sound letter symbolizing the short vowel sound.

The teacher introduces the student to at least one standard short vowel sound (BAG, BEG, BIG, BOG, BUG) and the standard short vowel sound's matching alphabetic letter, then combines the consonant sounds from the nine pairs of matched consonant sound with at least one standard short vowel sound to spell works having three sounds, the three sounds consisting of two consonant sounds and a short vowel sound. The sound letters of the present invention are an aid to help the student understand how sounds are combined to form words. The student places the sound letter A between two of the consonant sound letters learned previously. Students—including dyslexic students—discover they can read BAD, BAT, DAB, DAD, PAD, PAP, PAT, TAB, TAD, TAP, and TAT—plus three more words beginning with a standard short A vowel sound: AD, APT, and AT. The teacher reviews the words to ensure the student knows the single sound associated with each letter alphabetic letter introduced.

Except for the consonant sound associated with the alphabetic combination ZH and the sound letter ZH in the ZH and SH pair, the remaining matched pairs of voiced and unvoiced consonant sounds are taught in like manner. The consonant sound associated with the alphabetic combination ZH appears at the beginning of a word only in the word ZHIVAGO. The teacher makes sure the student learns the SH consonant by slowly repeating words beginning with the SH consonant sound—words such as SHIP, SHALL, SHACK, SHELL, and so on—until the student always holds up the SH sound letter matching the initial SH consonant sound in each word.

After introducing the sound letter A, and depending on how well and how quickly the student learns to correctly identify matched voiced and unvoiced consonants at the beginning of rhymed words, the teacher introduces one or all of the remaining four short vowel sounds associated with alphabetic letters E, I, O, and U (in BEG, BIG, BOG, and BUG), thereby doubling or tripling the number of words the student can form and read using the sound letters.

The teacher then introduces the student to the three nasal consonant sounds—M, N, and NG—symbolized by sound letters M, N, and NG, respectively. Nasal consonant sounds are sounds requiring a clear air passage through the reader's nose. The teacher asks the student to hold up the sound letter which matches the consonant sound coming at the end (instead of the beginning) of words such as BAM, BAN and BANK, KIM, KIN and KING, and DIM, DIN, and DING. The teacher then asks the student to correctly identify and spell the first sound in a series of rhyming words beginning with the consonant sound M and the consonant sound N, e.g., MINE & NINE, MET & NET, MILL & NIL.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. An aid for teaching reading to students, comprising:
   sound letters having a shape and appearance of standard English alphabet letters, each sound letter corresponding to a single sound most commonly associated with a particular alphabetic letter or combination of alphabetic letters of said standard alphabet, each said sound letter characterized as having a front, a back, a top, a bottom, a left side and a right side, said sound letters adapted for arrangement in a visually associated, juxtaposed relationship to form combinations of said sound letters, said combinations symbolizing words so that students are able to read said combinations of said sound letters phonetically, said sound letters further comprising:
   nine pairs of consonant sound letters, each said pair of consonant sound letters matched according to similarity in pronunciation, each said pair of consonant sound letters corresponding to a pair of voiced and unvoiced consonant sounds, said nine pairs of consonant sound letters comprising:
   a first pair of consonant sound letters, comprising:
     a sound letter B, said sound letter B having a shape and general appearance of an upper case alphabetic letter B, said sound letter B symbolizing a voiced consonant sound associated with the alphabetic letter B in the word BAD; and
     a sound letter P, said sound letter P having a shape and general appearance of an upper case alphabetic letter P, said sound letter P symbolizing an unvoiced sound associated with the alphabetic letter P in the word PAD;
   a second pair of consonant sound letters, comprising:
     a sound letter D, said sound letter D having a shape and general appearance of an upper case alphabetic letter D, said sound letter D symbolizing a voiced consonant sound associated with the alphabetic letter D in the word DAD; and
     a sound letter T, said sound letter T having a shape and general appearance of an upper case alphabetic letter T, said sound letter T symbolizing an unvoiced consonant sound associated with the alphabetic letter T in the word TAD;
   a third pair of consonant sound letters, comprising:
     a sound letter G, said sound letter G having a shape and general appearance of an upper case alphabetic letter G, said sound letter G symbolizing a voiced consonant sound associated with the letter G in the word GAB; and
     a sound letter K, said sound letter K having a shape and general appearance of an upper case alphabetic letter K, said sound letter K symbolizing an unvoiced consonant sound associated with the alphabetic letter K in the word KATE, Q in the word QUAKE, and C in the word CAKE;
   a fourth pair of consonant sound letters, comprising:
     a sound letter J, said sound letter J having a shape and general appearance of an upper case alphabetic letter J, said sound letter J symbolizing a voiced consonant sound associated with the alphabetic letter J in the word JAM; and
     a sound letter CH, said sound letter CH having a shape and general appearance of an upper case alphabetic letter C joined to an upper case alphabetic letter H, said sound letter CH symbolizing an unvoiced consonant sound associated with a combination of the alphabetic letter C and the alphabetic letter H in the word CHEER;
   a fifth pair of consonant sound letters, comprising:
     a sound letter TH-bar, said sound letter TH-bar having a general appearance of an upper case alphabetic letter T joined to an upper case alphabetic letter H, said sound letter TH-bar characterized as having an upper portion and a lower portion, said sound letter TH-bar further comprising a third indicia located in said sound letter TH-bar's lower portion, said sound letter TH-bar symbolizing a voiced consonant sound associated with a combination of the alphabetic letter T and the alphabetic letter H in the word THEN; and
     a sound letter TH, said sound letter TH having a shape and general appearance of an upper case alphabetic letter T joined to an upper case alphabetic letter H, said sound letter TH symbolizing an unvoiced consonant sound associated with a combination of the alphabetic letter T and the alphabetic letter H in the word THIN;
   a sixth pair of consonant sound letters, comprising:
     a sound letter V, said sound letter V having a shape and general appearance of an upper case alphabetic letter V, said sound letter V symbolizing a voiced consonant associated with the alphabetic letter V in the word VAN; and a sound letter F, said sound letter F having a shape and general appearance of an upper case alphabetic letter F, said sound letter F symbolizing an unvoiced consonant sound associated with the alphabetic letter F in the word FAN;

a seventh pair of consonant sound letters, comprising:

a sound letter W, said sound letter W having a shape and general appearance of an upper case alphabetic letter W, said sound letter W symbolizing a voiced consonant sound associated with the alphabetic letter W in the word WET; and a sound letter WH, said sound letter WH having a shape and general appearance of an upper case alphabetic letter W joined to an upper can alphabetic letter H, said sound letter WH symbolizing an unvoiced consonant sound associated with a combination of the alphabetic letter W and the alphabetic letter H in the word WHET;

an eighth pair of consonant sound letters, comprising:

a sound letter Z, said sound letter Z having a shape and general appearance of an upper case alphabetic letter Z, said sound letter Z symbolizing a voiced consonant sound associated with the alphabetic letter Z in the word ZIP; and a sound letter S, said sound letter S having a shape and general appearance of an upper case alphabetic letter S, said letter S symbolizing an unvoiced consonant sound associated with the alphabetic letter S in the word SIP; and a ninth pair of consonant sound letters, comprising:

a sound letter ZH, said sound letter ZH having a shape and general appearance of an upper case alphabetic letter Z joined to an upper case alphabetic letter H, said sound letter ZH symbolizing a voiced consonant sound associated with a combination of the alphabetic letter Z and the alphabetic letter H in the word ZHIVAGO, said voiced consonant sound symbolized by the sound letter ZH more commonly found in words such as "azure", "collision", "mirage", "equation", "treasure" and "casual"; and a sound letter SH, said sound letter SH having a shape and general appearance of an upper case alphabetic letter S joined to an upper case alphabetic letter H, said sound letter SH symbolizing an unvoiced consonant sound associated with a combination of the alphabetic letter S and the alphabetic letter H in the word SHIN;

nasal consonant sound letters, comprising:

a sound letter M, said sound letter M having a general appearance of an upper case alphabetic letter M, said sound letter M symbolizing a nasal consonant sound associated with the alphabetic letter M in the word MAP;

a sound letter N, said sound letter N having a shape and general appearance of an upper case alphabetic letter N, said sound letter N symbolizing a nasal consonant sound associated with the alphabetic letter N in the word NAP; and a sound letter NG, said sound letter NG having a shape and general appearance of an upper case alphabetic letter N joined to an upper case alphabetic letter G, said sound letter NG symbolizing a nasal consonant sound associated with a combination of the alphabetic letter N and the alphabetic letter G in the word SING;

residual consonant sound letters corresponding to less restricted, more free-flowing consonant sounds associated with the alphabetic letters H, L, R, and Y, when said alphabetic letters H, L, R, and Y are used at the beginning of words and syllables, said residual consonant sound letters comprising:

a sound letter H, said residual consonant sound letter H having a shape and general appearance of an upper case alphabetic letter H, said residual consonant sound letter H symbolizing a sound associated with the alphabetic letter H in the word HIP;

a sound letter L, said sound letter L having a shape and general appearance of an upper case alphabetic letter L, said sound letter L symbolizing a sound associated with the alphabetic letter L in the word LIP;

a sound letter R, said sound letter R having a shape and general appearance of an upper case alphabetic letter R, said sound letter R symbolizing a sound associated with the alphabetic letter R in the word RIP; and a sound letter Y, said sound letter Y having a shape and general appearance of an upper case alphabetic letter Y, said sound letter Y symbolizing a sound associated with the alphabetic letter Y in the word YIP; and standard short vowel sound letters corresponding to short vowel sounds of alphabetic letters A, E, I, O, and U, said standard short vowel sound letters consisting of:

a sound letter A, said sound letter A having a shape and general appearance of an upper case alphabetic letter A, said sound letter A symbolizing a sound associated with the alphabetic letter A in the word BAD;

a sound letter E, said sound letter E having a shape and general appearance of an upper case alphabetic letter E, said sound letter E symbolizing a sound associated with the alphabetic letter E in the word BED;

a sound letter I, said sound letter I having a shape and general appearance of an upper case alphabetic letter I, said sound letter I symbolizing a sound associated with the alphabetic letter I in the word BID;

a sound letter O, said sound letter O having a shape and general appearance of an upper case alphabetic letter O, said sound letter O symbolizing a sound associated with the alphabetic letter O in the word BOB; and a sound letter U, said sound letter U having a shape and general appearance of an upper case alphabetic letter U, said sound letter U symbolizing a sound associated with the alphabetic letter U in the word BUD;
a first indicia of each said sound letter's top; and
a second indicia of each said sound letter's back so that the top and back of each said sound letter are readily determinable by the student.

2. The apparatus of claim 1, further comprising:
a multiple consonant sound letter X-bar, said multiple consonant sound letter X-bar having a shape and general appearance of an upper case alphabetic letter X, said multiple consonant sound letter X-bar characterized as having an upper portion and a lower portion, said multiple consonant sound letter X-bar further comprising the third indicia in said multiple consonant sound letter X-bar's lower portion, said multiple consonant sound letter X-bar symbolizing sounds formed by said sound letter G and said sound letter Z in combination in the word EXIT; and
a multiple consonant sound letter X, said multiple consonant sound letter X having a shape and general appearance of an upper case alphabetic letter X, said multiple consonant sound letter X symbolizing sounds formed by said sound letter K and said sound letter S in combination in the word EXTRA, said sound letter K being the unvoiced partner of said sound letter G and said sound letter S being the unvoiced partner of said sound letter Z.

3. The apparatus of claim 4, further comprising:
a consonant sound letter Q, said sound letter Q having a shape and general appearance of an upper case alphabetic letter Q, said sound letter Q symbolizing a sound symbolized by said sound letter K.

4. The apparatus of claim 3, further comprising:
a consonant sound letter C, said sound letter C having a shape and general appearance of an upper case alphabetic letter C, said sound letter C symbolizing a sound symbolized by said sound letter K.

5. The apparatus of claim 2, further comprising:
a consonant sound letter C, said sound letter C having a shape and general appearance of an upper case alphabetic letter C, said sound letter C symbolizing a sound symbolized by said sound letter K.

6. The apparatus of claim 1, further comprising:
a consonant sound letter Q, said sound letter Q having a shape and general appearance of an upper case alphabetic letter Q, said sound letter Q symbolizing a sound symbolized by said sound letter K.

7. The apparatus of claim 1, further comprising:
a consonant sound letter C, said sound letter C having a shape and general appearance of an upper case alphabetic letter C, said sound letter C symbolizing a sound symbolized by said sound letter K.

8. The apparatus of claim 1, wherein said sound letters have shapes and general appearances of lower case alphabetic letters.

9. The apparatus of claim 1, wherein said sound letters have shapes and general appearances of a combination of upper case alphabetic letters and lower case alphabetic letters.

10. The apparatus of claim 1, wherein said sound letters further comprise:
a fourth indicia common to said consonant sound letter B and said consonant sound letter P;
a fifth indicia common to said consonant sound letter D and said consonant sound letter T;
a sixth indicia common to said consonant sound letter G, said consonant sound letter K, said consonant sound letter C and said consonant sound letter Q;
a seventh indicia common to said consonant sound letter J and said consonant sound letter CH;
an eighth indicia common to said consonant sound letter TH-bar and said consonant sound letter TH;
a ninth indicia common to said consonant sound letter V and said consonant sound letter F;
a tenth indicia common to said consonant sound letter W and said consonant sound letter WH;
an eleventh indicia common to said consonant sound letter Z and said consonant sound letter S; and
a twelfth indicia common to said consonant sound letter ZH and said consonant sound letter SH.

11. The apparatus of claim 10, further comprising:
a thirteenth indicia common to said nasal consonant sound letter M, said nasal consonant sound letter N, and said nasal consonant sound letter NG.

12. The apparatus of claim 11, further comprising:
a fourteenth indicia common to said residual consonant sound letter H, said residual consonant sound letter L, said residual consonant sound letter R, and said residual consonant sound letter Y.

13. The apparatus of claim 12, further comprising:
a fifteenth indicia common to said standard short vowel sound letter A, said standard short vowel sound letter E, said standard short vowel sound letter I, said standard short vowel sound letter O, and said standard short vowel sound letter U.

14. The apparatus of claim 13, further comprising:
a sixteenth indicia common to said multiple consonant sound letter X-bar and said multiple consonant sound letter X.

15. The apparatus of claim 1, further comprising means for attaching the sound letters to a surface.

16. The apparatus of claim 15, wherein the attaching means consists of magnets fastened to the sound letters.

17. The apparatus of claim 15, wherein the attaching means consists of magnets formed within the sound letters and having a surface flush with the back of the sound letters.

18. The apparatus of claim 15, wherein the attaching means consists of Velcro fasteners.

19. A method for teaching reading, comprising the steps of:
teaching the student to distinguish between voiced sounds and unvoiced sounds;
teaching the student to distinguish between consonant sounds and free-flowing vowel sounds;
teaching the student to spell consonant sounds by matching alphabetic letters associated with at least two pairs of voiced and unvoiced consonant sounds from a group of the sound of B in the word BAD and the sound of P in the word PAD, the sound of D in the word DAD and the sound of T in the word TAD, the sound of G in the word GILL and the sound of K in the word KILL, the sound of J in the word JUG and the sound of CH in the word CHUG, the sound of TH in the word THEN and the sound of TH in the word THIN, the sound of V in the word VAN and the sound of F in the word FAN, the sound of W in the word WET and the sound of WH in the word WHET, the sound of Z in the word ZIP and the sound of S in the word SIP, and the sound of ZH in the words ZHIVAGO and the sound of SH in the word SHIV;

teaching the student at least one short vowel sound and a matching alphabetic letter from a group of the sound of A in the word BAT, the sound of E in the word BEG, the sound of I in the word BIG, the sound of O in the word BOG, or the sound of U in the word BUT;

teaching the student to combine the matching alphabetic letter of at least one consonant sound of said pair of consonant sounds with the matching alphabetic letter of at least one vowel sound to produce a word; and reviewing said word with the student.

* * * * *